US012776327B2

(12) United States Patent
Jean

(10) Patent No.: US 12,776,327 B2
(45) **Date of Patent: *Oct. 27, 2026**

(54) LEVEL-OF-DETAIL AUDIO CODEC

(71) Applicant: Sony Interactive Entertainment LLC, San Mateo, CA (US)

(72) Inventor: Mathieu Jean, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/312,148

(22) Filed: May 4, 2023

(65) Prior Publication Data

US 2024/0127834 A1 Apr. 18, 2024

Related U.S. Application Data

(63) Continuation of application No. 17/160,872, filed on Jan. 28, 2021, now Pat. No. 11,682,406.

(51) Int. Cl.

*G10L 19/02* (2013.01)
*G10L 19/26* (2013.01)
*H04L 65/75* (2022.01)

(52) U.S. Cl.

CPC ............ *G10L 19/02* (2013.01); *G10L 19/265* (2013.01); *H04L 65/75* (2022.05)

(58) Field of Classification Search

CPC .............................. G10L 19/02; G10L 19/265
See application file for complete search history.

(56) References Cited

U.S. PATENT DOCUMENTS

RE40,281 E * 4/2008 Tzannes ................. H04B 1/665 375/219
10,062,389 B2 * 8/2018 Kawashima ............ G10L 19/26
10,210,877 B2 * 2/2019 Kawashima ........ G10L 19/0212
2009/0097676 A1 * 4/2009 Seefeldt ................... H03G 9/18 381/107
2021/0398547 A1 * 12/2021 Beack ...................... G10L 19/06
2022/0180881 A1 * 6/2022 Xiao ...................... G06N 3/045

FOREIGN PATENT DOCUMENTS

CA 2767327 A1 * 2/2008 ........... G10L 19/012
CA 2663904 C * 5/2014 ............. G10L 19/20
CN 106256000 A * 12/2016 ............. G10L 19/08
WO WO-2011121782 A1 * 10/2011 ........... G10L 21/038

OTHER PUBLICATIONS

Sporer et al., "The use of multirate Iter banks for coding of high quality digital audio", 6th European Signal Processing Conference (EUSIPCO), Amsterdam, Jun. 1992, vol. 1, pp. 211-214.

* cited by examiner

*Primary Examiner* — Anne L Thomas-Homescu
(74) *Attorney, Agent, or Firm* — Kilpatrick Townsend & Stockton LLP

(57) ABSTRACT

Techniques are described for audio decoding for, in an example, computer games. Audio is delivered in packets. The components of a packet are sorted in the time domain or the frequency domain by magnitude. An elimination threshold can be dynamically established with components below the threshold being eliminated from processing by the receiver, to save processing requirements.

20 Claims, 6 Drawing Sheets

LEVEL-OF-DETAIL AUDIO CODEC

CROSS-REFERENCES TO RELATED APPLICATIONS

This application claims benefit and is a continuation of application Ser. No. 17/160,872 filed Jan. 28, 2021, now U.S. Pat. No. 11,682,406, which application is incorporated herein by reference in its entirety.

FIELD

The application relates generally to technically inventive, non-routine solutions that are necessarily rooted in computer technology and that produce concrete technical improvements. In particular, the present application relates to level-of-detail audio codecs.

BACKGROUND

Audio decoders are computer programs executed by central processing units (CPUs) to process audio signals for audio-video programs and computer games, to play audio demanded by the audio signals. As understood herein, depending on the amount and level of audio at any given time, CPU processing of audio may become intense.

SUMMARY

Present principles further understand that some audio, particularly very quiet audio, may be eliminated from processing to, in effect, reduce the audio resolution in a way that would be imperceptible to a listener, i.e., without unduly sacrificing the listening experience while conserving CPU resources. Thus, techniques are described to compress/decompress the size of audio files. Techniques also are described for sorting content differently to save CPU processing.

Accordingly, a device includes at least one computer storage that is not a transitory signal and that in turn includes instructions executable by at least one processor to receive audio information. The audio information includes audio components. The instructions are executable to arrange the audio information in packets. Each packet includes plural of the audio components and the audio components are arranged in at least some packets in an order defined by magnitudes associated with respective audio components.

The device may include the processor and the processor may be implemented in a source of audio.

In some examples, the instructions can be executable to determine at least one envelope of a spectrum of the audio information. In these examples the instructions may be further executable to subtract the envelope from the spectrum to establish a residue, and to partition the residue by frequency to establish plural partitions. The instructions may be further executable to split the partitions into refinement stages, with each refinement stage including plural audio components for arranging the audio components in packets in the order defined by the magnitudes. In one variation, individual frequency components are arranged by magnitude, whereas in other variations, entire partition stages (groups of 16 or 32 components) are arranged by the potential magnitude they can produce. The instructions can be executable to identify, in the packets, the respective audio components by respective partition identification and refinement stage identification and, if desired, also by decompression parameters (codebook). The codebook is common for all components of a partition stage, but not all partition stages share the same codebook. The audio components may be frequency components.

In another aspect, a device includes at least one computer storage that is not a transitory signal and that in turn includes instructions executable by at least one processor to receive audio information in packets. At least a first one of the packets includes plural audio components of the audio information arranged in an order defined by magnitudes associated with the respective audio components, and the instructions are executable to process audio components in the first packets with magnitudes above a threshold. The instructions also are executable to not process audio components in the first packets with magnitudes below the threshold.

The device may include the processor and the processor may be implemented in a receiver of audio.

In some examples, the threshold has a first value for the first packet and a second value for a second packet different from the first packet and also including audio components of the audio information.

In example implementations the instructions can be executable to not process audio components in the first packets with magnitudes below the threshold by not decoding the audio components in the first packets with magnitudes below the threshold. The instructions can be executable to not process audio components in the first packets with magnitudes below the threshold by not rendering on at least one audio speaker the audio components in the first packets with magnitudes below the threshold.

In some embodiments the instructions can be executable to establish the threshold based at least in part on a demanded loudness of audio. In some embodiments the instructions can be executable to establish the threshold based at least in part on a workload of the at least one processor. The instructions may be executable to establish the threshold based at least in part on an attenuation zone of at least one low pass filter.

In another aspect, a method includes delivering audio in packets to a receiver. Components of audio in each packet are sorted in a frequency domain by magnitude. The method includes dynamically establishing an elimination threshold and eliminating from processing components having magnitudes below the threshold while processing components having magnitudes above the threshold.

The details of the present application, both as to its structure and operation, can best be understood in reference to the accompanying drawings, in which like reference numerals refer to like parts, and in which:

DETAILED DESCRIPTION

Figure 1:
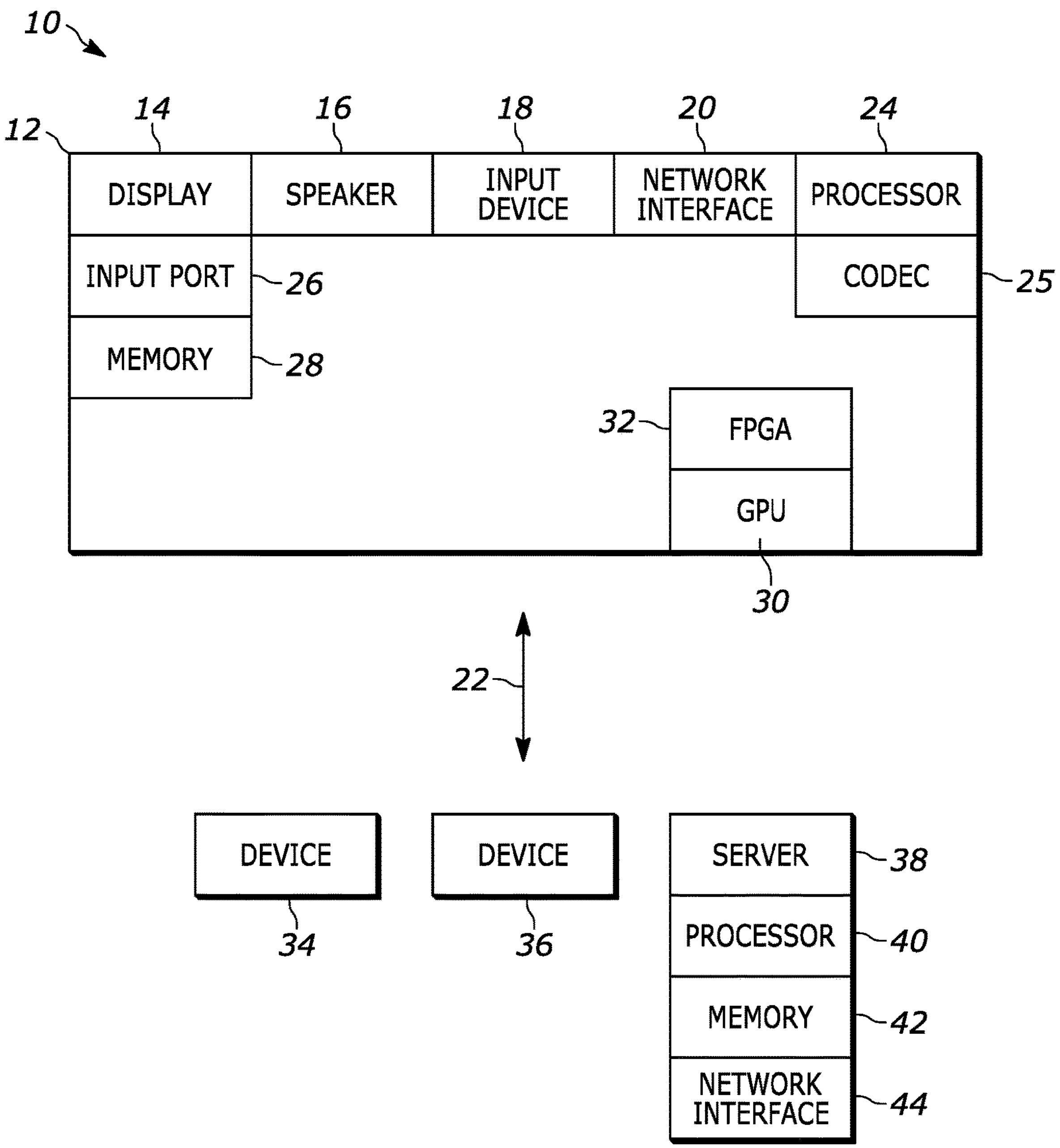
FIG. 1 is a block diagram of an example system consistent with present principles.

Now referring to FIG. 1, this disclosure relates generally to computer ecosystems including aspects of computer networks that may include computer devices such as but not limited to consumer electronics (CE) devices. A system herein may include server and client components, connected over a network such that data may be exchanged between the client and server components. The client components may include one or more computing devices including portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be a general-purpose single- or multichip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. Note that computerized devices described in the figures herein may include some or all of the components set forth for various devices in FIG. 1.

The first of the example devices included in the system 10 is a computer 12 which, like other computers described herein, is configured to undertake present principles (e.g., communicate with other computer devices to undertake present principles, execute the logic described herein, and perform any other functions and/or operations described herein).

Accordingly, to undertake such principles the computer 12 can be established by some or all of the components shown in FIG. 1. For example, the computer 12 can include one or more displays 14 that may be implemented by a high definition or ultra-high definition "4K" or higher flat screen and that may or may not be touch-enabled for receiving user input signals via touches on the display. The computer 12 may also include one or more speakers 16 for outputting audio in accordance with present principles, and at least one additional input device 18 such as e.g., an audio receiver/microphone for e.g., entering audible commands to the computer 12 to control the computer 12. The example computer 12 may further include one or more network interfaces 20 for communication over at least one network 22 such as the Internet, other wide area network (WAN), a local area network (LAN), a personal area network (PAN), etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the computer 12 to undertake present principles, including the other elements of the computer 12 described herein such as e.g., controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

The processor 24 can access one or more audio codecs 25 consistent with present principles.

In addition to the foregoing, the computer 12 may also include one or more input ports 26 such as, e.g., a high-definition multimedia interface (HDMI) port or a USB port to physically connect (e.g., using a wired connection) to another computer device and/or a headphone port to connect headphones to the computer 12 for presentation of audio from the computer 12 to a user through the headphones. The computer 12 may further include one or more computer memories 28 such as disk-based or solid-state storage that are not transitory signals, in some cases embodied in the chassis of the computer as standalone devices or as a personal video recording device (PVR) or video disk player either internal or external to the chassis of the computer or as removable memory media. Also, in some embodiments, the computer 12 can include a graphics processing unit (GPU) 30 and/or a field-programmable gate array (FPGA) 32. The GPU and/or FPGA may be used by the computer 12 for, e.g., artificial intelligence processing such as training neural networks and performing the operations (e.g., inferences) of neural networks in accordance with present principles. However, note that the processor 24 may also be used for artificial intelligence processing such as where the processor 24 might be a central processing unit (CPU).

Still referring to FIG. 1, in addition to the computer 12, the system 10 may include one or more other computer device types that may include some or all of the components shown for the computer 12. In one example, a first device 34 and a second device 36 are shown and may include similar components as some or all of the components of the computer 12. Fewer or greater devices may be used than shown.

The system 10 also may include one or more servers 38. A server 38 may include at least one server processor 40, at least one computer memory 42 such as disk-based or solid-state storage, and at least one network interface 44 that, under control of the server processor 40, allows for communication with the other devices of FIG. 1 over the network 22, and indeed may facilitate communication between servers, controllers, and client devices in accordance with present principles. Note that the network interface 44 may be, e.g., a wired or wireless modem or router, Wi-Fi transceiver, or other appropriate interface such as, e.g., a wireless telephony transceiver.

Accordingly, in some embodiments the server 38 may be an Internet server and may include and perform "cloud" functions such that the devices of the system 10 may access a "cloud" environment via the server 38 in example embodiments. Or the server 38 may be implemented by a game console or other computer in the same room as the other devices shown in FIG. 1 or nearby.

The devices described below may incorporate some or all of the elements described above.

Figure 2:
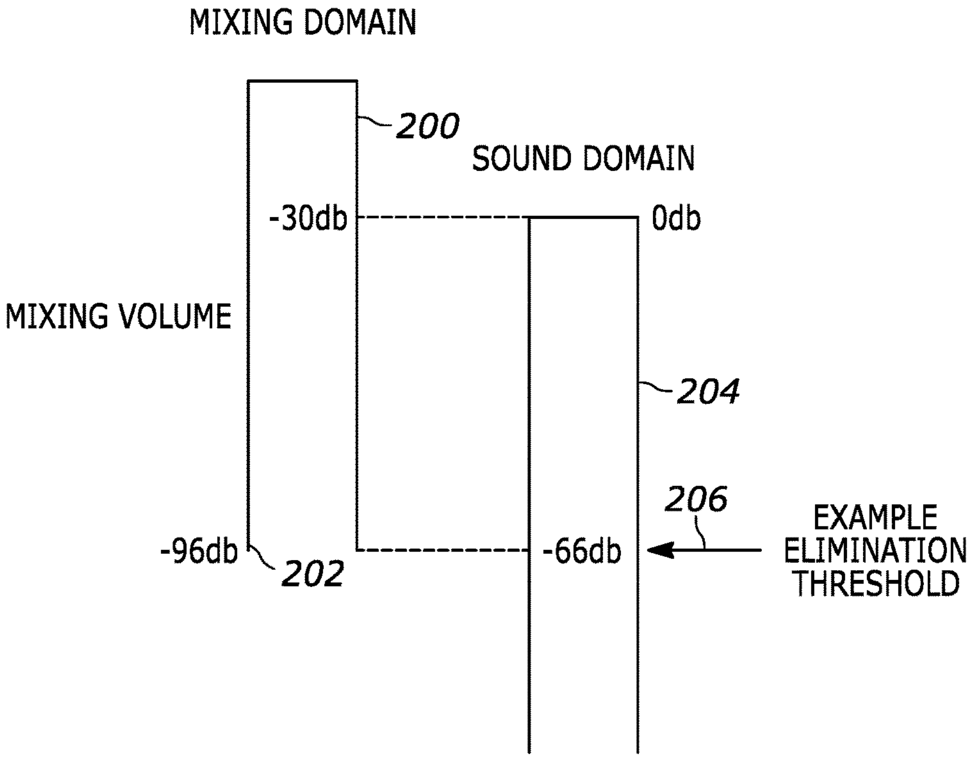
FIG. 2 illustrates a mixing domain for mixing plural sounds juxtaposed with a domain for a single one of the sounds.

FIG. 2 illustrates a mixing domain 200 extending from a low volume 202 up to higher volumes. The mixing volume 202 represents plural sounds mixed together, the volume 204 of a single one of which also is shown. A minus thirty (−30) decibel (db) level in the mixing volume 200 corresponds to a zero (0) db level in the sound volume 204, while a −96 db level in the mixing volume 200 corresponds to a −66 db level in the sound volume 204, with the arrow 206 indicating that an example cutoff threshold may be established at '66 db in the sound volume, for illustration purposes only.

Figure 3:
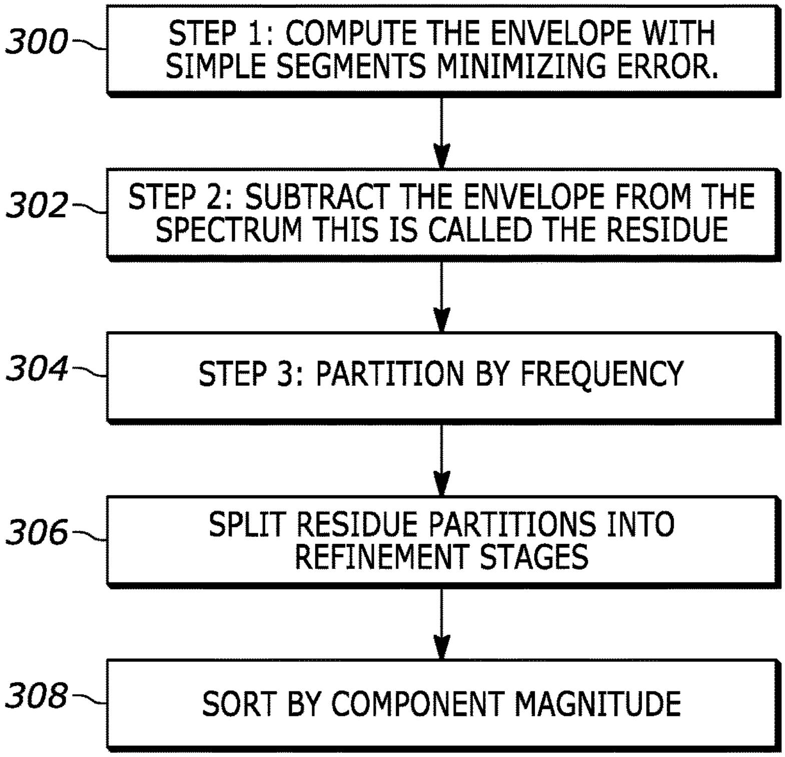
FIG. 3 illustrates example logic in example flow chart format for sorting audio components by magnitude.
Figure 4:
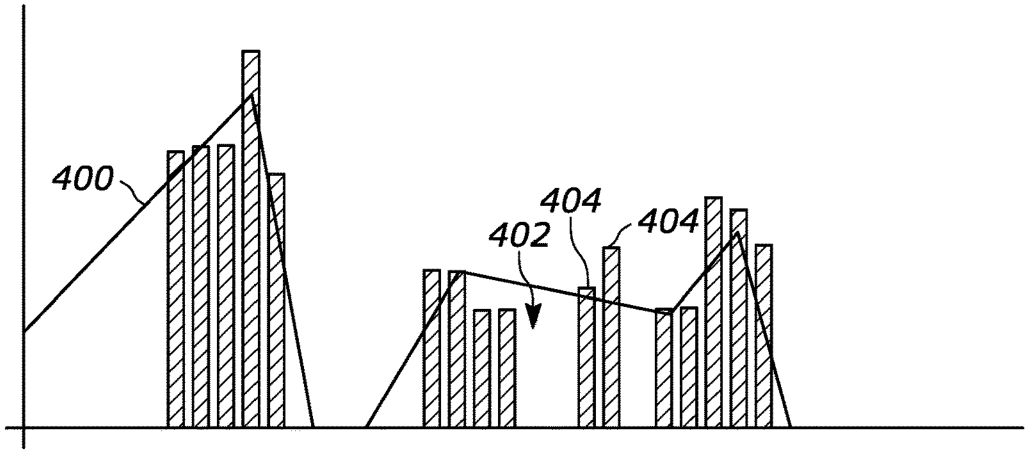
FIGS. 4-6 are graphs of amplitude versus frequency to illustrate principles discussed in relation to FIG. 3.
Figure 5:
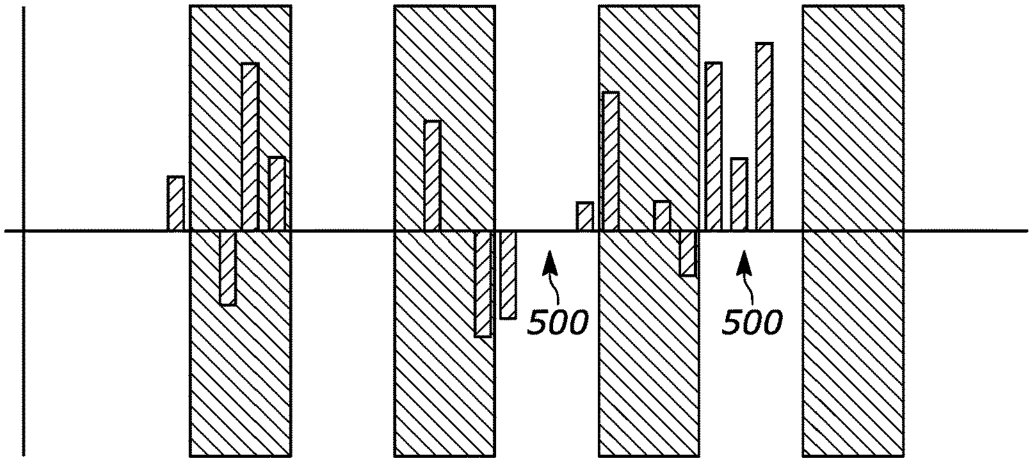
Figure 6:
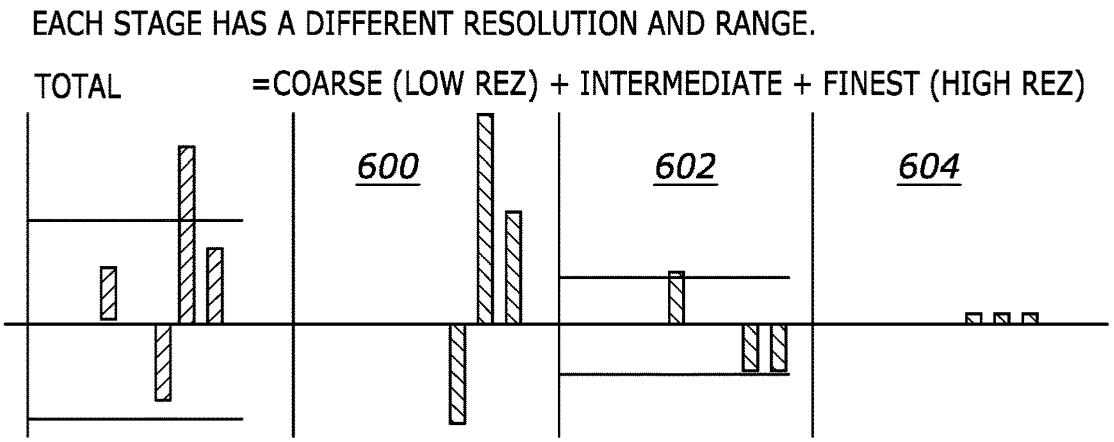

Turn now to FIG. 3 and to the related graphs in FIGS. 4-6 for an understanding how a processor executing an audio codec at a source or transmitter of audio orders audio components. Commencing at block 300, the envelope 400 in FIG. 4 of the audio spectrum 402 which includes multiple frequency components 404 is computed. As shown, the computation provides a simple straight segment envelope 400 that approximates the shape of the spectrum.

Moving to block 302 the envelope 400 is subtracted from the spectrum 402 to yield a residue 500 shown in FIG. 5. Proceeding to block 304, the residue is partitioned by frequency into plural partitions, and then at block 306 each partition is further reduced into three refinement stages, namely, a coarse (low resolution) stage 600 in FIG. 6, an intermediate stage 602, and a fine (highest resolution) stage 604. Further details are given by Vorbis at xiph.org, relevant documents incorporated herein and included in an information submission in this application.

Concluding the logic of FIG. 3, at block 308 the audio components (frequency components in the example shown) are provided in packets and are sorted by magnitude. In other words, with the audio information arranged in packets, each packet includes plural audio components and the audio components are arranged in at least some packets and preferably all packets in an order defined by magnitudes associated with the respective audio components. Note that a packet typically has a length, defined in milliseconds, of audio produced, once decoded. In the context of present disclosure, one packet at a time may be decoded, and the audio components such as partitions are arranged by magnitude, not necessarily the packets themselves.

The final frequency component magnitude is computed by A=Envelope_Vol*(Coarse+Inter+Fine), where "Envelope_Vol" is the magnitude of the envelope at the point in time represented by the packet and "(Coarse+Inter+Fine)" is the sum of magnitudes in the optional three refinement stages for the partition(s) represented by packet.

Each of the residue stages have a known maximum range due to the limited compression codebook list of values. From that list of possible values, it is possible to get the maximum expected and use that as a heuristic for sorting.

Given that known range the maximum possible change for each of the partition's stages can be computed as follows:

$$\text{Max}(P,S)=\text{Envelope\_Vol}*\text{Range}(P,S)$$

At block 308 all stages in a packet are sorted in the packet from the stage with the highest magnitude (using the above Max(P,S) equation in one implementation) to the stage with the lowest magnitude and written into the stream in that order.

Note that in an alternate embodiment a codec may remain in the time domain (which does not decompose audio components into frequency components).

Figure 7:
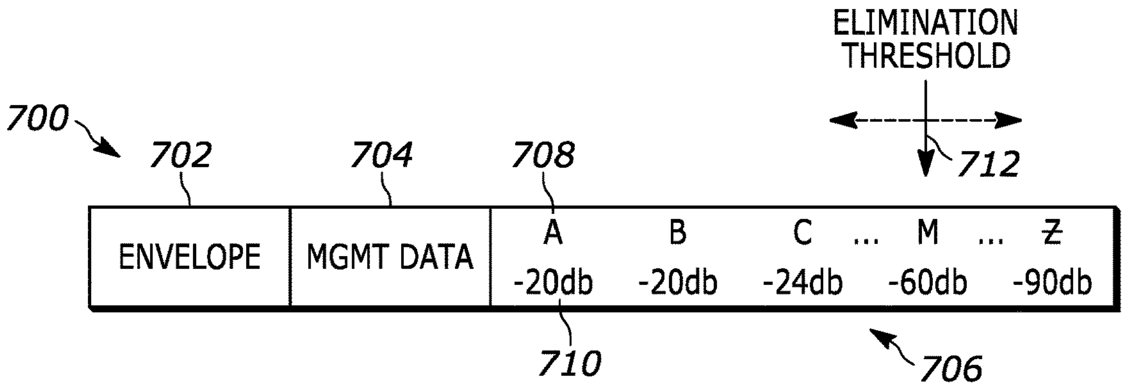
FIG. 7 illustrates the data structure of a packet of audio consistent with present principles.

FIG. 7 illustrates an example packet 700 constructed in accordance with FIG. 3. An envelope header 702 describes the rough line-segment envelope curve shown in FIG. 4 that approximates the shape of the spectrum. A management data portion 704 describes the Partition data which dictates which codebook to use, and for how many frequency components. The codebook determines the scale and resolution of each frequency band to be decoded.

Spectrum details may also be included to describe the "residual spectrum" or "residue" 600 shown in FIG. 5.

As mentioned above, the audio components are sorted by order of magnitude, highest to lowest, in a packet body 706. In FIG. 7, each audio component 708 is shown with an annotated magnitude 710 to illustrate this sort, but in implementation the magnitudes 710 need not be included as data in the packet. Note that the respective audio components in the packet can be identified by their respective partition identifications and refinement stage identifications.

The "sorting" can be done according to the inherent magnitude of the partitions and modulated by the envelope. For one audio packet, this order is fixed and is key to proper decoding. As discussed further below, an elimination threshold 712 may be established with audio components having magnitudes below the threshold not being processed by the receiver and those above the threshold being processed. As indicated by the horizontal dashed arrows, the threshold 712 may be dynamic, i.e., can change packet to packet.

Figure 7A:
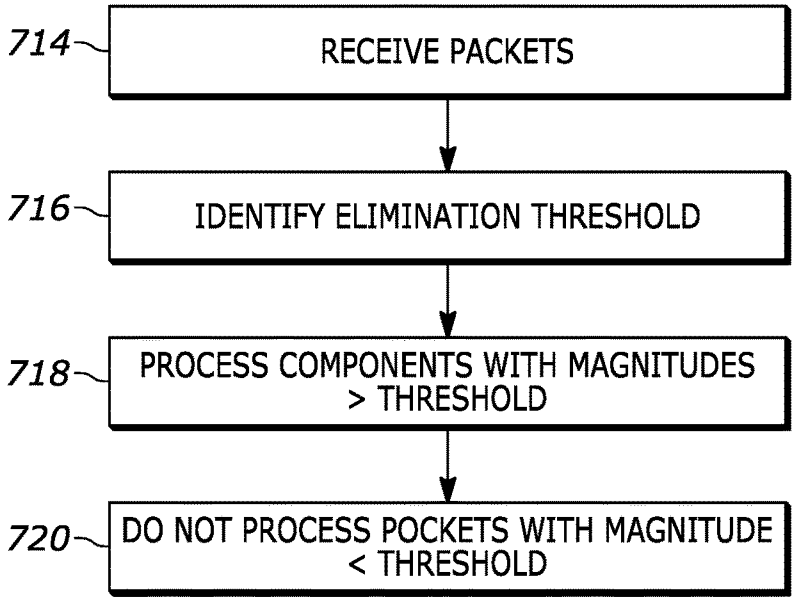
FIG. 7A illustrates receiver logic for processing packets such as that shown on FIG. 7.

FIG. 7A illustrates receiver-side (renderer-side) logic for processing packets. Commencing at block 714, packets containing audio information are received. As discussed above, one or more packets include plural audio components of the audio information arranged in an order defined by magnitudes associated with the respective audio components.

Moving to block 716, the elimination threshold indicated at 712 in FIG. 7 is identified by the receiver. The threshold may be dynamically established at the receiver end or may be sent with the packet. Proceeding to block 718, audio components with magnitudes above the threshold are processed, whereas block 720 indicates that audio components with magnitudes below the threshold are not processed. Packets with magnitudes at the threshold may be processed or not depending on the embodiment.

In some embodiments, not processing audio components with magnitudes below the threshold may include not decoding the audio components with magnitudes below the threshold. In some embodiments, not processing audio components with magnitudes below the threshold may include not rendering on audio speakers the audio components with magnitudes below the threshold. Combinations of the above may be used.

For further illustration, the following pseudo-code is provided for level of details (LOD) Codec encoding/decoding, though other techniques for encoding/decoding could also be used. The pseudo-code may aim to implement the LOD feature while keeping the same audio quality and the same compression ratios as original Vorbis codec code. However, note that other packet organizations are also possible.

The purpose of a codebook may be to help decompress the bit stream to obtain usable values for frequency components. The codebook may contain a Huffman probability tree, final value tables, and resolution.

The codebook table may be established as a list of codebooks used to compress/decompress a specific file. Each codebook may be identified by an ID number from 0 to N and may be specified in the header of the file.

An envelope may be a line segment approximating the audio spectrum for one packet. A residue or residual spectrum may be what remains of the initial spectrum once it has been normalized by the envelope.

The partition may be a division of the residual spectrum, e.g., a group 16 or 32 frequencies.

The partition stage may be a group of values of the same size as the partition (16 or 32), that is an approximation of the residual spectrum or a refinement thereof.

Thus, to encode a packet, from the psycho acoustic processing the system may obtain an envelope, the codebooks to use for each partition stage (each may be of different resolution and not all stages may be used), and the residue.

Keep in mind that the decoder may only know the data that it has decoded prior to a specific step. Thus, the process is aimed at evaluating possibilities of what comes next in the file.

For preparation, the preparation may be done before any packet is encoded, as it may need to be computed only once. Thus, for preparation the system may compute the maximum value produced by each codebook, for all codebooks used in the file. The system may get the maximum value in the codebook value list, multiply by the codebook resolution to give the maximum potential value that will be added when decoding with this codebook and store this maximum value per codebook for later.

For each packet, the envelope may be encoded by encoding the points of the line segment, one by one into the output stream. The partition codebook IDs may then be encoded for all partitions (e.g., low to high frequency). For all used stages of this partition (e.g., coarse to fine), the codebook ID may be combined with a temporary variable. The combined variable may then be written (e.g., compressed).

After the envelope and partition codebook IDs are encoded, the future order of partition stages may be computed based on the maximum value each can add to the spectrum. Thus, a temporary table of volumes from the envelope may be built, for each partition (low to high frequency). This may be done by evaluating the envelope between the beginning and the end of the partition and keeping the maximum volume in the table to index by partition offset from the start.

After the temporary table of volumes from the envelope are built, all the partition's codebooks may be evaluated. This may be done for all partitions (low to high frequency) and for all used stages (coarse to fine), in order to get the maximum value from the stage codebook which may then be multiplied by the maximum volume from the envelope table built as described above. This may give the maximum possible value for this stage. A temporary structure may then be created to describe this stage's encoding parameters, including the codebook ID used (used to encode the actual residual frequencies), the stage's max value possible, and the partition's offset (which may be which part of the spectrum the system will approximate with this). After the temporary structure is created, it may be inserted into a sorted container such as a hashset, map, sorted array, or other suitable container as long as the system can iterate in-order of key. The key may be the max volume of the structure. In case of equality, the partition offset may be used to ensure order stability.

Thus, at the end of evaluating all the partition's codebooks, the system will have a sorted list of partition stages encoding parameters ordered by maximum possible value.

Next, the partition stages may be encoded. This may be done for all items in the sorted list described immediately above. Thus, the system may process the stage for all frequency magnitude values in the partition. The system may find the best match of this magnitude in the legal values of the selected codebook, minimizing the remainder. The system may then write the compressed bit pattern associated with the matching value to the output stream, subtract the matching value from the magnitude, and write back the remainder in the spectrum buffer for the next refinement stage of this partition. The outer loop may be for all partitions, in the order of the temporary sorted structure, from high magnitude to low magnitude.

Then in terms of decoding a packet, on the decoder side the file header may have already been read. It may contain all the possible codebooks used in that file. The same preparation step of computing the maximum possible value per codebook may be done once for the file. The file header may also indicate how many partitions there are in the spectrum.

Thus, for each packet, the envelope may be decoded by decoding the points of the line segment. The partition codebook IDs may then be decoded for all partitions (low to high frequency) by reading the compressed combined codebooks values from the stream and extracting the coarse/intermediate/fine codebook IDs from the value (e.g., results in 1 to 3 codebook IDs).

After the partition codebook IDs are decoded, the system may compute the future order of partition stages based on the maximum value each can add to the spectrum. To do this, a temporary table of volumes from the envelope may be built for each partition (low to high frequency) by evaluating the envelope between the beginning and the end of the partition and keeping the maximum volume in the table, indexed by partition offset from the start.

After the temporary table of volumes from the envelope is built, the system may then evaluate all the partition's codebooks. Thus, for all partitions (low to high frequency), for all used stages codebook IDs from the step of decoding the partition codebook IDs, for this partition (coarse to fine) the system may get the maximum value from the stage codebook. The system may then multiply that by the maximum volume from the temporary table of volumes from the envelope built as described above. This may give the maximum possible value for this stage. The system may then create a temporary structure to describe this stage's encoding parameters, including the codebook ID used (used to decode the actual residual frequencies), the stage's max value possible, and the partition's offset (which part of the spectrum the system will approximate with this).

Then after the system creates the temporary structure to describe the encoding parameters, the system may insert this structure in the same sorted container used in the encoder. In case of equality, the partition offset may be used to ensure order stability.

At the end of evaluating all the partition's codebooks, the system may have a sorted list of partition stages decoding parameters ordered by maximum possible value.

Thus, after computing the future order of partition stages based on the maximum value each can add to the spectrum, the system may decode the partition stages for all items in the sorted list that are of higher volume than the target threshold. To do so, the system may process the stage, for each expected frequency, by reading a compressed bit pattern from the stream, matching the compressed bit pattern to a real value with the codebook list of values, and adding the value to the spectrum (at the designated partition location). The outer loop may be for all partitions, in the order of the temporary sorted structure, from high magnitude to low magnitude After decoding the partition stages, the system may then reconstruct the full spectrum by applying the envelope. The system may then do the reverse MDCT of the spectrum to transform to time-domain signal.

Figure 8:
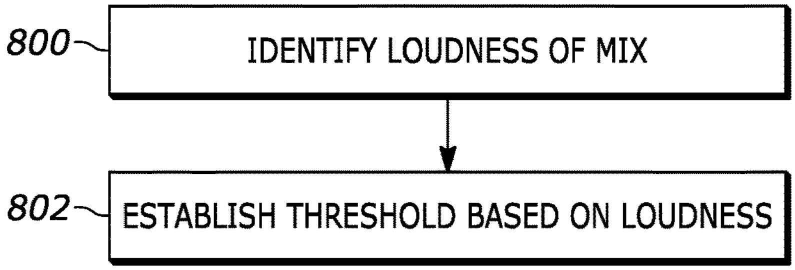
FIGS. 8-10 illustrate example logic in example flow chart format of various techniques for dynamically establishing the magnitude cutoff threshold.

As indicated previously, the elimination threshold 712 may be dynamic, e.g., it may have a first value for the first packet and a second value for a second packet different from the first packet. In the example of FIG. 8, a loudness of a demanded audio mix to be played may be identified by the receiver processor at block 800, and the elimination established at block 802 based on the loudness, e.g., moving the threshold to a higher decibel cut-off for louder mixes and a lower decibel cut-off for quieter mixes.

Figure 9:
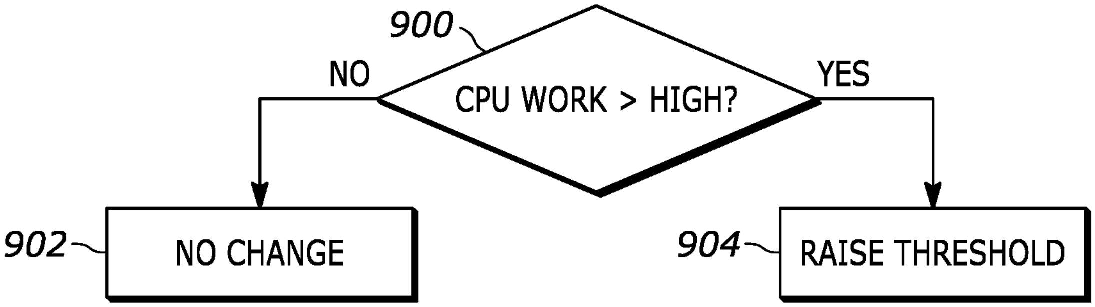

In addition, or alternatively, FIG. 9 illustrates that receiver processor (e.g., CPU) workload may be used to establish the elimination threshold. If it is determined at decision diamond 900 that CPU workload is relatively high, a lower threshold may be changed at block 904 to be higher, i.e., to eliminate more audio components from processing. A lower CPU workload may result in no change to the threshold at block 902 or a lowering of the threshold, i.e., to allow more audio components to be processed.

Figure 10:
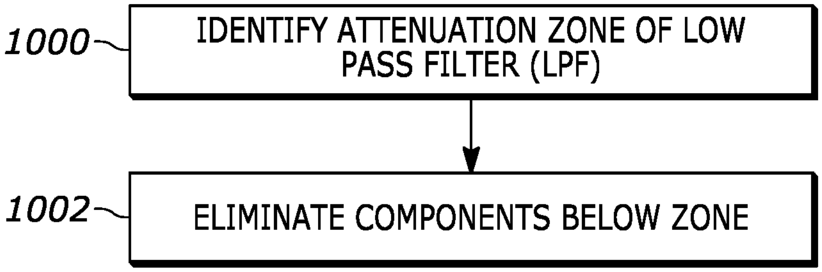
Figure 11:
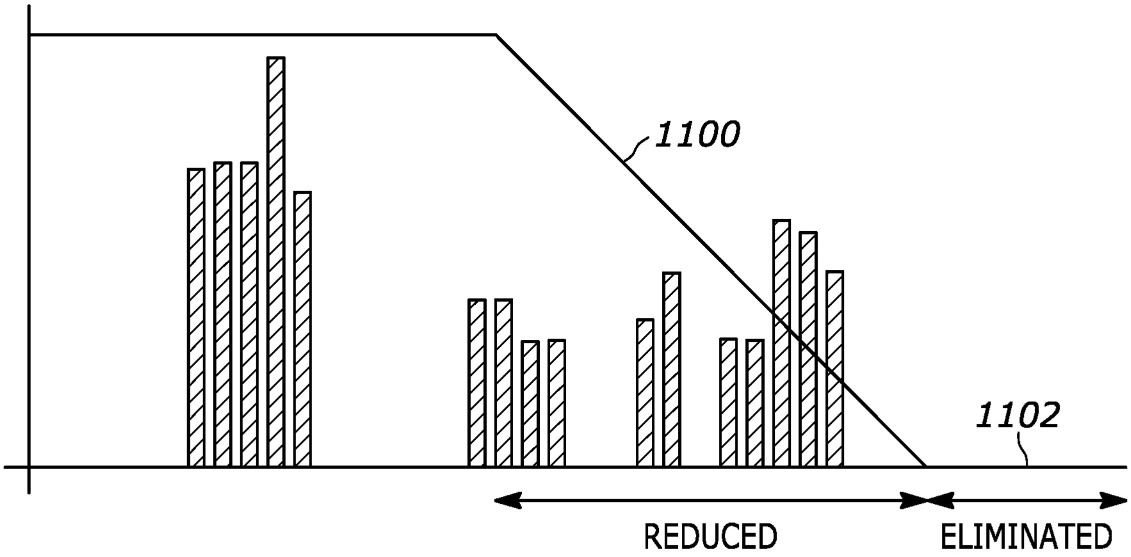
FIG. 11 illustrates another technique for eliminating some audio components from processing.

FIGS. 10 and 11 illustrate that an attenuation zone 1100 (FIG. 11) of a low pass filter (LPF) in the receiver may be identified at block 1000 of FIG. 10 and used at block 1002 to establish the elimination threshold in whole or in part, eliminating from processing components 1102 below the threshold.

Figure 12:
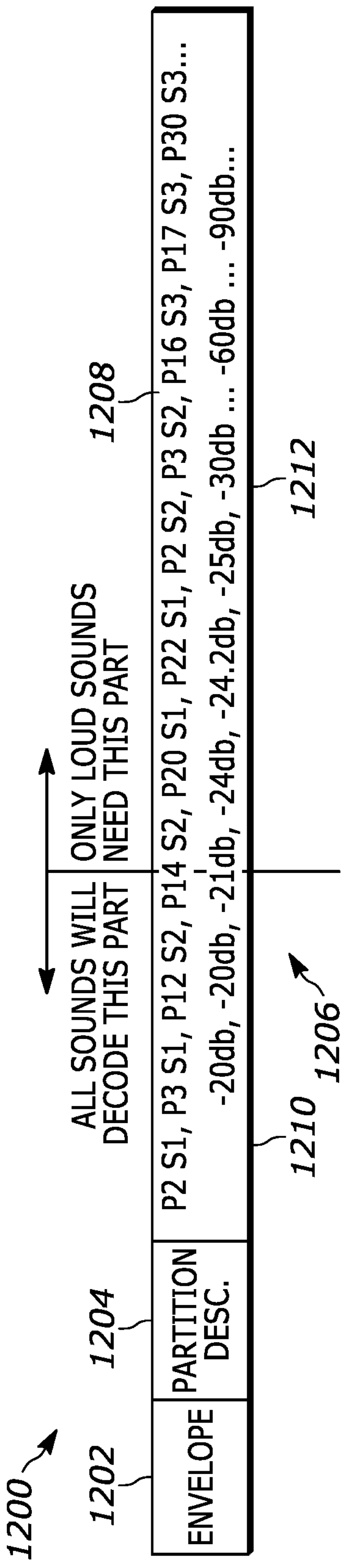
FIG. 12 illustrates an example audio packet to illustrate a technique for splitting high and low magnitude components.

FIG. 12 illustrates a packet 1200 consistent with present principles with an envelope portion 1202, management (partition description) portion 1204, and audio component portion 1206. The audio components 1208 in the audio component portion 1206 may be split into higher magnitude and lower magnitude files 1210, 1212, with all sounds decoding audio components in the higher magnitude file 1210 and only loud sounds decoding those in the lower magnitude file 1212.

Figure 13:
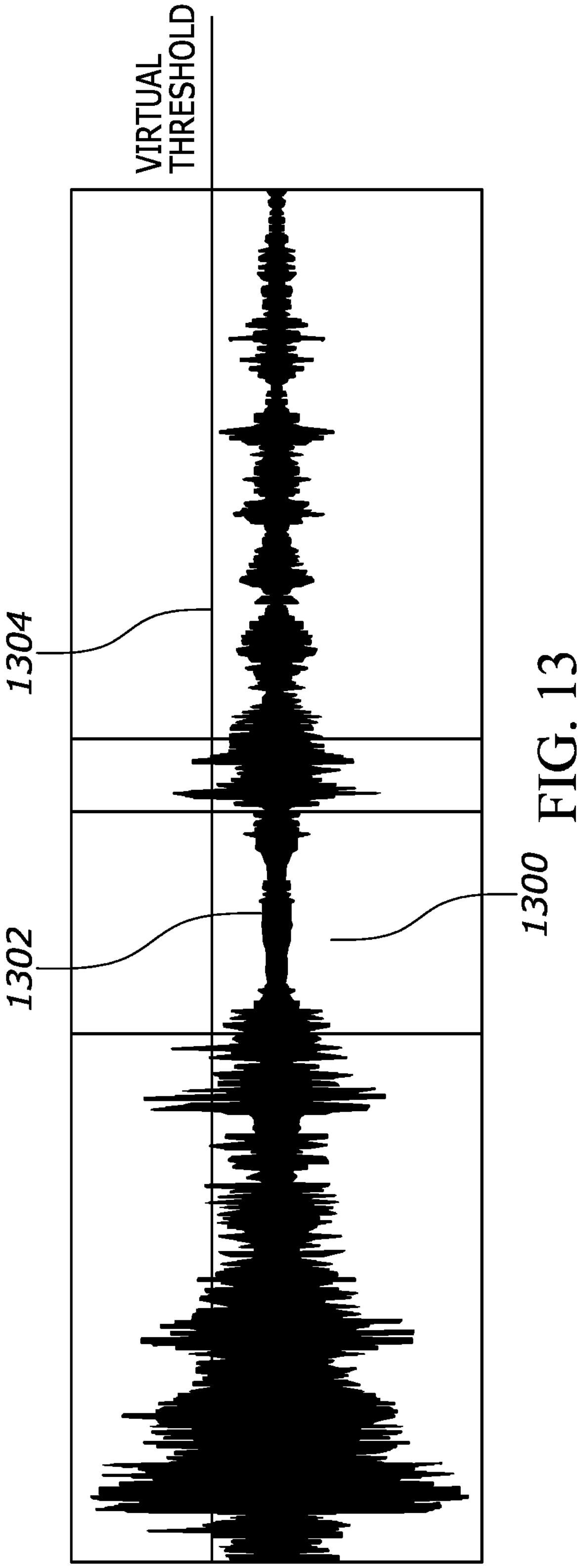
FIG. 13 illustrates content-driven virtualness.

FIG. 13 illustrates a spectrum 1300 in which sounds that have a temporary low-volume content 1302 below a virtual volume threshold 1304 may be skipped when processing. Only the envelope of the spectrum 1300 need be decoded to ascertain if content in a particular part of the spectrum is loud enough (i.e., above the threshold 1304) to be played. This dispenses with the need for calculating a modified discrete cosine transform (MDCT) and avoiding processing pitch, LPF, or mixing the sound.

In alternate embodiments, in a three-stage implementation described above (low resolution, medium resolution, and high-resolution stages) one stage may be omitted entirely from processing in lieu of ordering the audio components as described. In other embodiments, frequency components may be ordered by volume, but this may pose a compression challenge.

It will be appreciated that whilst present principals have been described with reference to some example embodiments, these are not intended to be limiting, and that various alternative arrangements may be used to implement the subject matter claimed herein.

What is claimed is:

1. A device comprising:

at least one computer storage that is not a transitory signal and that comprises instructions executable by at least one processor to:

identify audio information comprising audio components;

generate plural partitions based on frequency components of the audio information;

associate each partition of the plural partitions with refinement stages, each refinement stage comprising plural audio components corresponding to a shared codebook for the refinement stage; and arrange the audio components in at least some packets in an order defined by magnitudes.

2. The device of claim 1, wherein the order is from highest to lowest magnitude.

3. The device of claim 1, wherein the audio components are frequency components.

4. A device comprising:

at least one computer storage that is not a transitory signal and that comprises instructions executable by at least one processor to:

receive audio information in packets, the audio information comprising audio components;

generate plural partitions based on frequency components of the audio information;

associate each partition of the plural partitions with refinement stages, each refinement stage comprising plural audio components corresponding to a shared codebook for the refinement stage;

process the audio components in the packets with magnitudes above a threshold; and not process audio components in the packets with magnitudes below the threshold.

5. The device of claim 4, comprising the at least one processor.

6. The device of claim 5, wherein the at least one processor is implemented in a receiver of audio.

7. The device of claim 4, wherein the audio components are frequency components.

8. The device of claim 4, wherein the threshold has a first value for a first packet of the packets and a second value for a second packet of the packets different from the first packet and comprising audio components of the audio information.

9. The device of claim 4, wherein the instructions are executable to:

not process audio components in the packets with magnitudes below the threshold by not decoding the audio components in the packets with magnitudes below the threshold.

10. The device of claim 4, wherein the instructions are executable to:

not process audio components in the packets with magnitudes below the threshold by not rendering on at least one audio speaker the audio components in the packets with magnitudes below the threshold.

11. The device of claim 4, wherein the instructions are executable to:

establish the threshold based at least in part on a demanded loudness of audio.

12. The device of claim 4, wherein the instructions are executable to:

establish the threshold based at least in part on a workload of the at least one processor.

13. The device of claim 4, wherein the instructions are executable to:

establish the threshold based at least in part on an attenuation zone of at least one low pass filter.

14. A method, comprising:

delivering audio information in packets to a receiver;

determining audio components of the audio information in the packets;

generating plural partitions based on frequency components of the audio information;

associating each partition of the plural partitions with refinement stages, each refinement stage comprising plural audio components corresponding to a shared codebook for the refinement stage;

dynamically establishing an elimination threshold based on audio component magnitudes; and eliminating from processing audio components having magnitudes below the elimination threshold while processing audio components having magnitudes above the elimination threshold.

15. The method of claim 14, wherein the audio is computer game audio.

16. The device of claim 4, wherein an order of the audio components is from highest to lowest magnitude.

17. The method of claim 14, wherein the audio components in each packet are sorted by magnitudes from highest to lowest amplitude.

18. The device of claim 1, wherein the shared codebook is identified in packet management data for the refinement stage and applies to multiple frequency components of the refinement stage.

19. The device of claim 1, wherein arranging the audio components in packets in the order defined by magnitudes includes ordering refinement stages according to a maximum possible value for each refinement stage based on a maximum value of the shared codebook and a maximum envelope volume for a corresponding partition.

20. The device of claim 1, wherein different refinement stages of a partition correspond to different codebooks.

* * * * *